(12) United States Patent
Graham et al.

(10) Patent No.: US 11,429,283 B2
(45) Date of Patent: *Aug. 30, 2022

(54) DETERMINING A DEVICE WEAR-RATE

(71) Applicant: Hewlett-Packard Development Company, L.P., Spring, TX (US)

(72) Inventors: Christoph J. Graham, Spring, TX (US); Thomas J. Flynn, Spring, TX (US); Virginia Quance Herrera, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/083,689

(22) Filed: Oct. 29, 2020

(65) Prior Publication Data
US 2021/0042042 A1 Feb. 11, 2021

Related U.S. Application Data

(63) Continuation of application No. 16/091,050, filed as application No. PCT/US2016/041483 on Jul. 8, 2016, now Pat. No. 10,860,218.

(51) Int. Cl.
*G06F 3/06* (2006.01)
*G06F 11/34* (2006.01)
(Continued)

(52) U.S. Cl.
CPC .......... *G06F 3/0616* (2013.01); *G06F 3/0653* (2013.01); *G06F 3/0659* (2013.01);
(Continued)

(58) Field of Classification Search
CPC ............... G06F 3/0616; G06F 11/3485; G06F 11/3452; G06F 11/3072; G06F 11/3034;
(Continued)

(56) References Cited

U.S. PATENT DOCUMENTS 6,460,151 B1 10/2002 Warwick et al.
7,395,394 B2 7/2008 Federa et al.
(Continued)

FOREIGN PATENT DOCUMENTS

CN 101069157 11/2007
CN 101252585 8/2008
(Continued)

OTHER PUBLICATIONS

"Storage Workload Analysis", Feb. 2016.
(Continued)

*Primary Examiner* — Masud K Khan
(74) *Attorney, Agent, or Firm* — Brooks Cameron & Huebsch PLLC

(57) ABSTRACT

Example implementations relate to determining a device wear-rate. An example system for determining a device wear-rate can include a plurality of filter drivers to: monitor system requests for I/O associated with a device of the system and transmit information associated with the system requests to a filter manager. The system can also include the filter manager to catalog the information, a service to collate the information across a plurality of machine configurations and workloads, and a processor to determine a wear-rate of the device based on an analysis of the collated information.

12 Claims, 4 Drawing Sheets

(51) Int. Cl.
G06F 11/30 (2006.01)
G06F 11/07 (2006.01)
G06F 11/00 (2006.01)

(52) U.S. Cl.
CPC .......... G06F 3/0673 (2013.01); G06F 11/076 (2013.01); G06F 11/0727 (2013.01); G06F 11/3034 (2013.01); G06F 11/3055 (2013.01); G06F 11/3072 (2013.01); G06F 11/3433 (2013.01); G06F 11/3452 (2013.01); G06F 11/3485 (2013.01); *G06F 11/004* (2013.01); *G06F 11/008* (2013.01); *G06F 11/3058* (2013.01)

(58) Field of Classification Search
CPC ............ G06F 11/3055; G06F 11/3433; G06F 3/0653; G06F 3/0659; G06F 3/0673; G06F 11/0727; G06F 11/076; G06F 11/004; G06F 11/3058; G06F 11/008; G06F 11/3037; G06F 12/0246; G06F 3/067

See application file for complete search history.

(56) References Cited

U.S. PATENT DOCUMENTS

| | | | |
|---|---|---|---|
| 8,677,044 | B1 | 3/2014 | Gandhi |
| 9,037,792 | B1 | 5/2015 | Ingle et al. |
| 2009/0168524 | A1 | 7/2009 | Golov et al. |
| 2009/0204852 | A1* | 8/2009 | Diggs .................. G06F 11/008 714/42 |
| 2009/0216649 | A1 | 8/2009 | Hubbard |
| 2011/0016273 | A1 | 1/2011 | Kusama et al. |
| 2013/0198459 | A1* | 8/2013 | Joshi .................. G06F 12/0891 711/130 |
| 2015/0261438 | A1 | 9/2015 | Nagaraj |
| 2016/0034208 | A1 | 2/2016 | Cepulis |
| 2016/0078966 | A1 | 3/2016 | Li et al. |
| 2017/0199769 | A1* | 7/2017 | Jain ....................... G06F 9/5077 |

FOREIGN PATENT DOCUMENTS

| | | |
|---|---|---|
| CN | 101595461 | 12/2009 |
| CN | 101821696 | 9/2010 |
| WO | WO-1995034070 | 12/1995 |
| WO | WO-2012060824 | 5/2012 |
| WO | WO-2015128192 | 9/2015 |
| WO | WO-2015155613 | 10/2015 |

OTHER PUBLICATIONS

Liu, Y et al, "Automatic Identification of Application I/O Signatures From Noisy Server-Side Traces", Feb. 17-20, 2014.

Luu, H et al, "The Dashboard: HPC I/O Analysis made Easy", Mar. 1-2, 2010.

* cited by examiner

DETERMINING A DEVICE WEAR-RATE

PRIORITY INFORMATION

This application is a continuation of U.S. National Stage application Ser. No. 16/091,050 filed on Oct. 3, 2018, which claims priority to International Application No. PCT/US2016/041483 filed on Jul. 8, 2016. The contents of which are incorporated herein by reference in its entirety.

BACKGROUND

An application (also known as an application program) is a program designed to perform a group of coordinated functions, tasks, or activities for the benefit of a user. Input/output (I/O) is communication between an information processing system (e.g., computer) and the outside world. Different applications can perform I/O in different ways.

DETAILED DESCRIPTION

Figure 1:
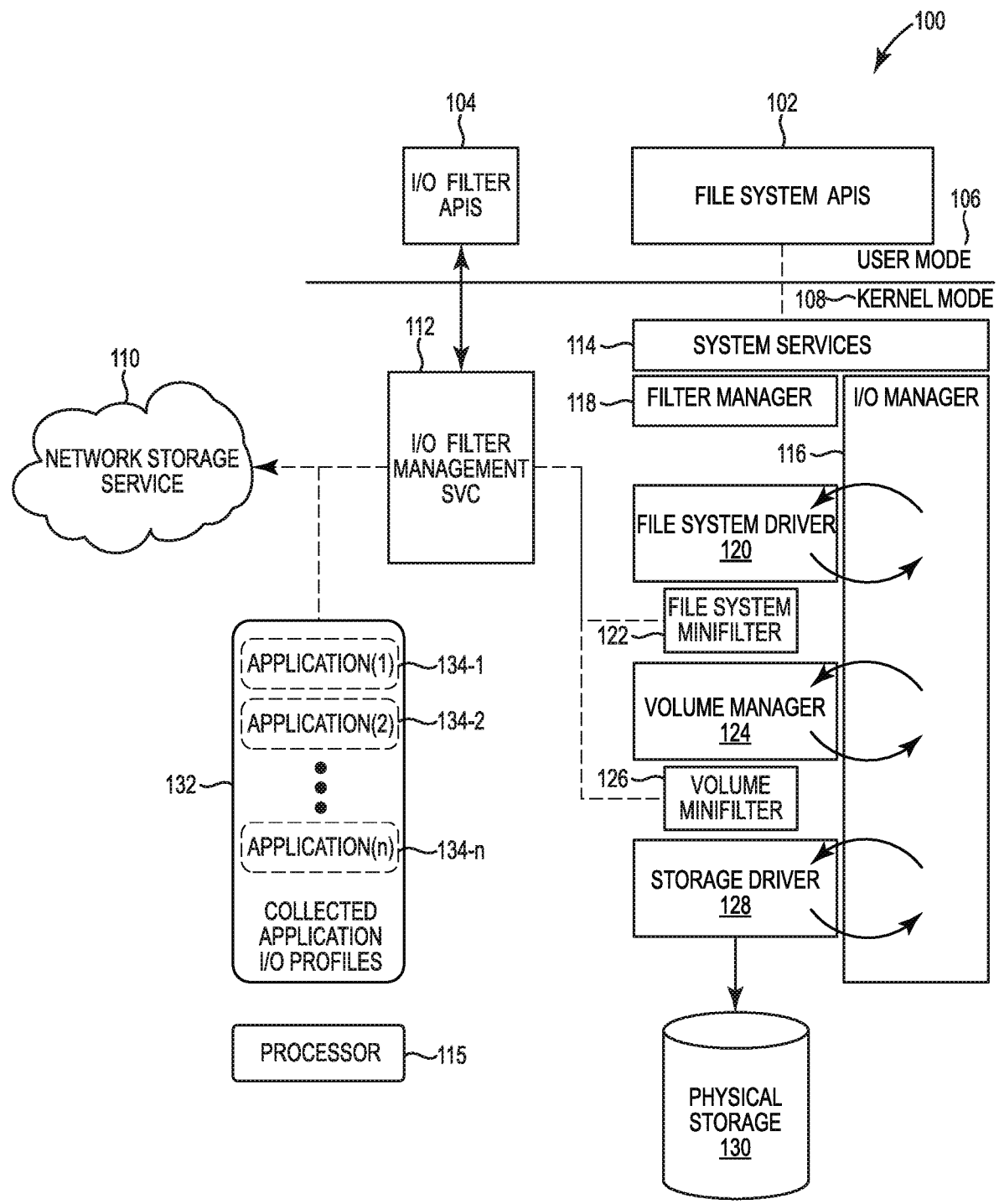
FIG. 1 illustrates a diagram of a system including a plurality of filter drivers, a filter manager, and a service according to an example.

Modeling and identifying offensive and/or detrimental application behaviors within a system can be challenging because applications perform I/O in different ways. As used herein, offensive and/or detrimental application behaviors can include behaviors that undermine the performance of a device and/or the application. For instance, an offensive and/or detrimental application behavior can include an application behavior that undermines the endurance of solid state media (e.g., solid state drives (SSDs)).

Operating systems (OSs) support multiple processes running simultaneous, multiple subsystems for managing I/O and memory utilization, and applications can use multiple application program interface (API) endpoints or methods of mapping, manipulating, and persisting data to storage devices. At the device level, data can be a collection of disparate storage device commands over a common bus interface, without any detail that identifies which application or OS process performed it. Without more information and/or detail, a device wear-rate determination can be difficult and/or unreliable. For example, the only factors that can be available to determine how long a device has been used or to make a determination regarding accumulation of data bits stored in the device include power-on hours, and read/write counts, but predictions can only be made as to whether the device has been used lightly or heavily with little more detail. As a result, little detail about actual usage of the device is available, so predictive failure model precision may be reduced.

Applications that write to persistent storage devices (e.g., thin clients) can cause premature device (e.g., SSD) wear. For example, logging applications that write a small amount of data, flush it to a disk, and close and re-open the file can cause premature device wear. This can cause increased write/erase cycles on the device than is desirable. Similar, repetitive access to a device (e.g., a hard disk drive) may cause premature failure. Premature wear can result in early device failure, so it can be beneficial to determine a wear-rate of a device to improve the device wear-rate, and or predict device failure before it occurs.

Some approaches to determining a device wear-rate include the use of a write filter (e.g., disk filtering and registry filtering), but these write filters can be difficult to understand and use, resulting in misconfiguration of disconnecting of the write filter by a user. The write filter may not allow for a system user or administrator to know which files or registry keys any given application writes and with what frequency. This can increase difficulty in setting write filter parameters and/or configuring the write filter.

In contrast, examples of the present disclosure can allow for analysis of I/O behavior of an application or applications, filtering out additional noise of multiple applications or OS services within an OS and correlation of data at a high-level (e.g., process/application) through the I/O processes, where high-level information can be stripped away to turn an I/O request into raw data and storage commands. This is in contrast to other approaches that can only record a number of bytes of written or read information. Additionally, correlation of the data can be performed across groups of machines and/or devices to build families of aggregate data, such that determinations can be made with respect to outliers.

Examples of the present disclosure can also allow for identification of an actual impact of an application and application workload on a device, and can allow for visualization of impacts of I/O caused by an application, regardless of its I/O method. Additionally, examples of the present disclosure can allow for modeling a configuration of an I/O filtering subsystem based on application analysis rather than human input, which can be incomplete or error prone.

In some examples, a device driver layer can be utilized to monitor application behaviors, and these behaviors can be used to collect additional information (e.g., writes, reads, outliers, etc.) about how individual processes and/or applications are using a device. Determinations can be made with respect to the life of the device—in particular, its wear-rate—based on the additional information, as will be discussed further herein.

FIG. 1 illustrates a diagram of a system 100 including a plurality of filter drivers 120, 124, 128, a filter manager 118, and a service 112, according to an example. FIG. 1 also illustrates I/O filter APIs 104 and file system APIs 102 as part of user mode 106. The remaining components are part of kernel mode 108. For instance, kernel mode 108 includes I/O manager 116, system services 114, filter manager 118, file system driver 120, file system minifilter 122, volume manager 124, volume minifilter 126, storage driver 128, physical storage 130, I/O filter management service 112, network storage service 110, processor 115, and applications 134-1, 134-2, . . . , 134-n within collected application I/O profiles cache 132.

The plurality of filter drivers 120, 124, 128 can monitor system requests for I/O associated with a device of the system and can transmit information associated with the system requests to filter manager 118, which can manage the insertion or removal of the minifilter drivers 122 and 126. Filter manager 118, in some examples, can manage more filters than illustrated in FIG. 1 (e.g., a registry filter). The plurality of filter drivers 120, 124, 128 can also monitor system request for I/O from direct APIs and/or memory-mapped I/Os. The plurality of filter drivers 120, 124, 128, along with minifilters 122 and 126 can make up a device driver layer. This layer monitors the system for application behaviors (e.g., system requests for I/O as noted above) to collect information about how the applications and/or other processors are using the device.

I/O filter management service 112 can catalog the information. In some examples, I/O filter management service 112 can catalog the system requests based on application context, amount of I/O, type of I/O and time. File system minifilter 122 and volume minifilter 126 can act as gatekeepers in that it can work in unison to capture different types of I/O (e.g., those occurring at an API or file system level, and those occurring at a device or memory-mapped level). They can watch every I/O interaction between the plurality of drivers 120, 124, 128 and an application layer (e.g., including applications 134-1, 134-2, . . . , 134-n).

Network storage service 110 can collate the cataloged information across a plurality of machine configurations and workloads, and processor 115 can determine a wear-rate of the device based on an analysis of the collated information. Processor 115 can also analyze the collaged information to determine groupings of commonality and determine an outlier within the system. Processor 115 can also determine when the wear-rate of the device surpasses a particular threshold.

I/O filter management service 112 can determine which applications 134-1, 134-2, . . . , 134-n are reading and writing and how much data they are reading and writing. Additionally or alternatively, I/O filter management service 112 can determine from which files (e.g., a common set of files) applications 134-1, 134-2, . . . , 134-n are reading and writing. Usage patterns can be created using these determinations, and the usage patterns can be sent to the network storage service 110 for collation of behaviors across multiple machines, devices, systems, etc. Collation can occur, in some instances, in a database not illustrated in FIG. 1.

Cache 132, in some examples, can include application I/O profiles. For instance, this can include read/write profiles on each of applications 134-1, 134-2, . . . , 134-n, as well as other profile information.

In some examples, system 100 can understand which processes are performing I/O operations, and which processes are relatable into the construct of an application. As used herein, an application can include a single process executing a single thread or multiple threads. An application can also include multiple executables, which can spawn multiple processes, service daemons (owned by the OS and/or the application) and additional software services such as registry or database access.

System 100 can monitor processes for I/O requests and filter underlying software services (such as the registry) via a registry filter (not illustrated) to capture mechanisms of I/O that can be associated back to an owning process. Further, system 280 can use additional data or hints to determine how binary executables interrelate to form an application. Example binary executables can include binaries sharing the same resource handles, memory contexts, and/or files. Binaries with common signatures (e.g., code signing) identifying them as from a same organization can also be examples of binary executables, as used herein.

An application can deploy these I/O mechanisms simultaneously. System 100 can analyze and correlate data between the I/O mechanisms (e.g., read/write mechanisms) using filters to monitor and digitally tag data throughout the I/O process flow. This data tagging can be compared to an actual data payload of the I/O requests to an underlying device and exercised against physical segments of the device. By doing so, system 100 can monitor, tag, and capture a data log of the I/O operations that can be post-processed for visualization and analysis of the effects of an application on the device's wear-rate.

At a volume layer, including volume minifilter 126 and volume manager 124, determinations can be made with respect to how I/O operations are translated to device bus commands, as well as with respect to I/O operations' impacts to the device. Monitoring at the volume layer, in some examples, can catch modifications to I/O operations from components such as a cache manager, or interactions with a memory manager for memory mapped I/O or virtual memory management. System 100 can continue with digital tagging for data blocks, and these digital tags can be used to correlate the flow of data from a high-level application down to direct impacts to the device. Once collected, the data can be post-processed into visualizations for user-readability and/or processed into machine-readable instructions and configuration options for a write filter manager.

Figure 2:
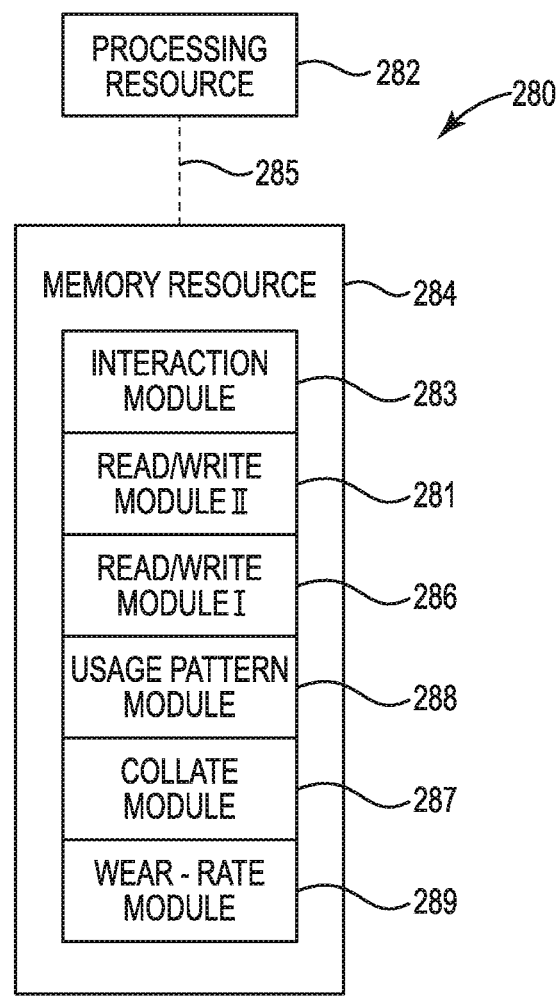
FIG. 2 illustrates a diagram of an example computing system including a processing resource, a memory resource, and a number of modules according to an example.

FIG. 2 illustrates a diagram of an example computing system 280 including a processing resource 282, a memory resource 284, and a number of modules 283, 281, 286, 288, 287, 289 according to an example. The computing system 280 can utilize instructions (e.g., software and/or firmware) hardware, and/or logic to perform a number of functions including those described herein. The computing system 280 can be a combination of hardware and program instructions configured to share information. The hardware, for example, can include a processing resource 282 and/or a memory resource 284 (e.g., (e.g., computer readable medium (CRM), machine readable medium (MRM), etc., database, etc.).

A processing resource 282, as used herein, can include a processor (e.g., processor 115 illustrated in FIG. 1) capable of executing instructions stored by a memory resource 284. Processing resource 282 can be implemented in a single device or distributed across multiple devices. The program instructions (e.g., machine-readable instructions (MRI)) can include instructions stored on the memory resource 284 and executable by the processing resource 282 to implement a desired function (e.g., memory mode categorization).

The memory resource 284 can be in communication with a processing resource 282. A memory resource 284, as used herein, can include memory components capable of storing instructions that can be executed by processing resource 282. Such memory resource 284 can be a non-transitory CRM or MRM. Memory resource 284 can be integrated in a single device or distributed across multiple devices. Further, memory resource 284 can be fully or partially integrated in the same device as processing resource 282 or it can be separate but accessible to that device and processing resource 282. Thus, it is noted that the computing system 280 can be implemented on a participant device, on a server device, on a collection of server devices, and/or a combination of the user device and the server device.

The memory resource 284 can be in communication with the processing resource 282 via a communication link (e.g., a path) 285. The communication link 285 can be local or remote to a machine (e.g., a computing system) associated with the processing resource 282. Examples of a local communication link 285 can include an electronic bus internal to a machine (e.g., a computing system) where the memory resource 284 is one of volatile, non-volatile, fixed, and/or removable storage medium in communication with the processing resource 282 via the electronic bus.

A module and/or modules 283, 281, 286, 288, 287, 289 can include MRI that when executed by the processing resource 282 can perform a number of functions including those described herein. The number of modules 283, 281, 286, 288, 287, 289 can be sub-modules of other modules. For example, the read/write module I 286 and the read/write module II 281 can be sub-modules and/or contained within the same computing system. In another example, the number of modules 283, 281, 286, 288, 287, 289 can comprise individual modules at separate and distinct locations (e.g., MRM, etc.).

Each of the number of modules 283, 281, 286, 288, 287, 289 can include instructions that when executed by the processing resource 282 can function as a corresponding engine. For example, the interaction module 283 can include instructions that when executed by the processing resource 282 can function as an interaction engine. Similar, each of the number of modules 283, 281, 286, 288, 287, 289 can include instructions that when executed by the processing resource 582 can function as engines.

In some examples, engines can be part of a system (not illustrated) including a database, a subsystem, and the number of engines. The subsystem can include the number of engines in communication with the database via a communication link (e.g., link 285 as referenced in FIG. 2). The system can represent instructions and/or hardware of a network controller (e.g., system 280 as referenced in FIG. 2, etc.).

The number of engines can include a combination of hardware and programming to perform functions including those described herein. The instructions can include instructions (e.g., software, firmware, etc.) stored in a memory resource (e.g., CRM, MRM, etc.) as well as hard-wired program (e.g., logic).

In an example, interaction module 283 can include instructions that when executed by the processing resource 282 can cause a computing system to monitor interactions between a file system and an application layer of the computing system. For instance, interactions can be monitors for activity including reading and writing, as well as how often the reads and writes occur, how many reads and writes occur, when reads and writes occur, etc.

Read/write module II 281 can include instructions that when executed by the processing resource 282 can cause a computing system to determine, using a file system filter layer, a plurality of applications of the application layer that are reading and writing data. In some examples, the instructions can be executable to determine from which files associated with the computing system the plurality of applications are reading and writing.

Read/write module I 286 can include instructions that when executed by the processing resource 282 can cause a computing system to determine how much data each of the plurality of applications is reading and writing. For instance, certain applications can perform read and/or write operations more often than others.

Usage pattern module 288 can include instructions that when executed by the processing resource 282 can cause a computing system to create system device usage patterns based on the monitored interactions, determined plurality of applications, and determined amount of data. In some examples, the creation of the system device usage patterns can be further based on the determinations made with respect to from which files associated with the computing system the plurality of applications are reading and writing. These usage patterns can include patterns of devices that use certain applications, perform certain operations, read and/or write for certain amounts of time, etc.

Collate module 287 can include instructions that when executed by the processing resource 282 can cause a computing system to collate the usage patterns across a plurality of system devices using a network services layer and a database. In some examples, the usage patterns can be collated based on a location of one of the plurality of system devices, a usage date of one of the plurality of system devices, a usage time of one of the plurality of system devices, a business group of one of the plurality of system devices, and/or application usage of one of the plurality of system devices.

Wear-rate module 289 can include instructions that when executed by the processing resource 282 can cause a computing system to determine wear-rate patterns of the plurality of system devices based on the collation. For instance, devices can be grouped based on the correlations, but these groups can have outliers. For example a device within a particular group, also known as a concentration, can be an outlier if it performs differently than others with similar behaviors. For instance, an outlier can have a higher failure probability as compared to others in its group. Using these outliers, as well as the collation, a wear-rate for devices can be determined.

Figure 3:
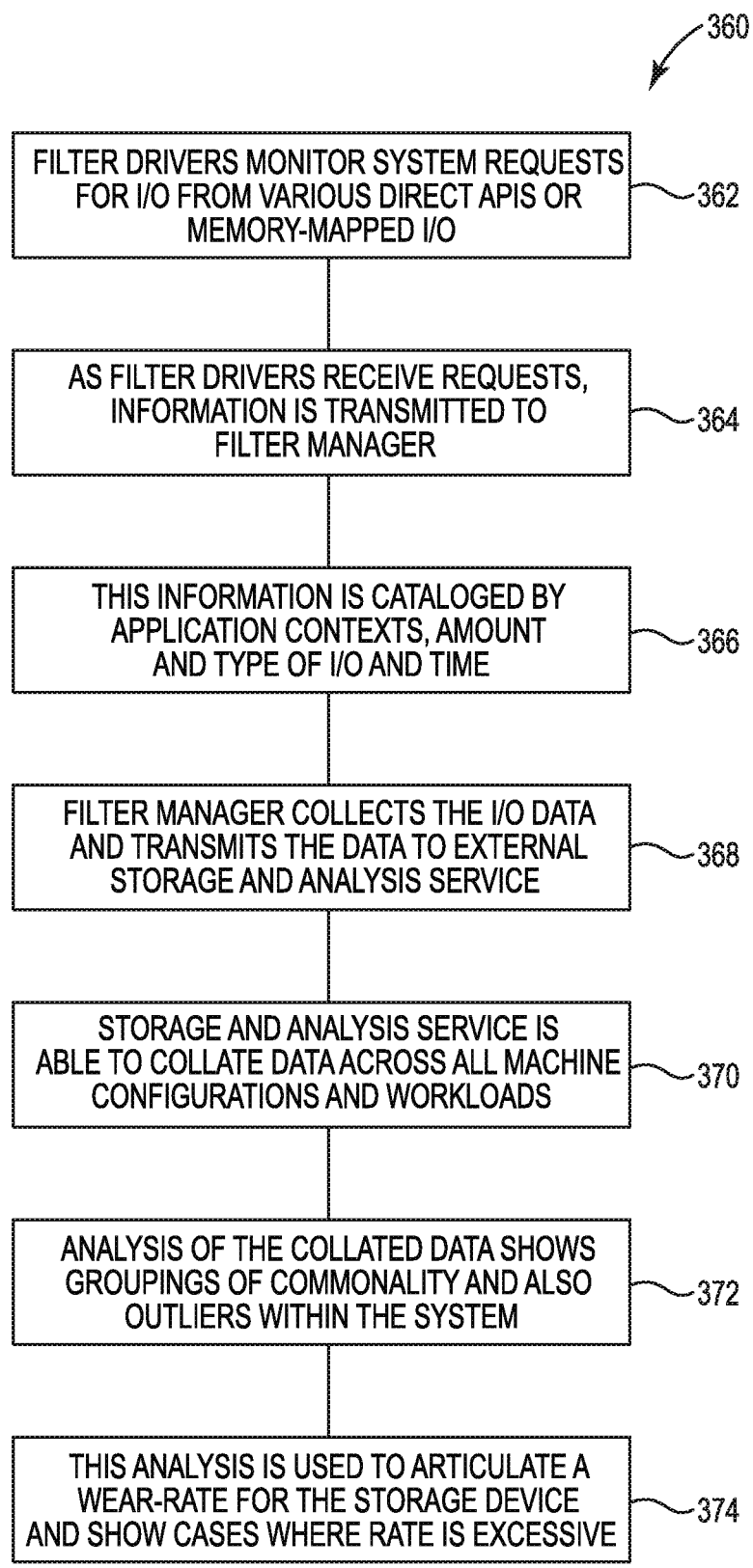
FIG. 3 illustrates a diagram of a method for determining a device wear-rate according to an example.

FIG. 3 illustrates a diagram of a method 360 for determining a device wear-rate according to an example. Method 360, in some examples, can be performed in a plurality of different operating systems. Method 360 can coordinate data from multiple services by placing filters at multiple layers in the I/O chain. For instance, these filters can coordinate data based on a hash of a data blob, other digital keying and/or tagging, and/or other unique markers to extrapolate identifying information that can be lost during the conversion of high-level API requests into bus commands to underlying devices (e.g., storage devices). Through this coordination of data and a data logging mechanism, the filters and corresponding data visualization services can coordinate and correlate commands and underlying data sizes that are read and written from within an application domain.

At 362, method 360 can include filter drivers monitoring system requests for I/O from various direct APIs or memory-mapped I/Os. Based on this monitoring, at 364, method 360 can include transmitting the monitored information to a filter manager as filter drivers receive requests. For instance, while requests are being received at a filter driver, the monitored information can be sent and can be cataloged, for instance, at 366 by application contexts, amount and type of I/O, and time. This can help group or concentrate the information into categories.

Method 360, at 368, can include the filter manager collecting the I/O data and transmitting the data to an external storage and analysis service, and at 370, method 360 can include the storage and analysis service collating data across machine configurations and workloads. This allows for comparisons across different devices. At 372, method 360 can include analyzing the collated data to show groupings of commonality and outliers within the system. For instance, certain devices can have the same or similar application usage, time of usage, amount of usage, etc. Within these areas of similar behaviors, outliers can appear, which can include devices having higher failure probabilities as compared to other devices in a similar grouping.

Method 360, at 374, can include using the analysis to articulate a wear-rate for the device and show cases where the wear-rate is excessive. For instance, when a wear-rate exceeds a particular threshold, the device can be taken out of service or repaired in order to avoid failure.

Figure 4:
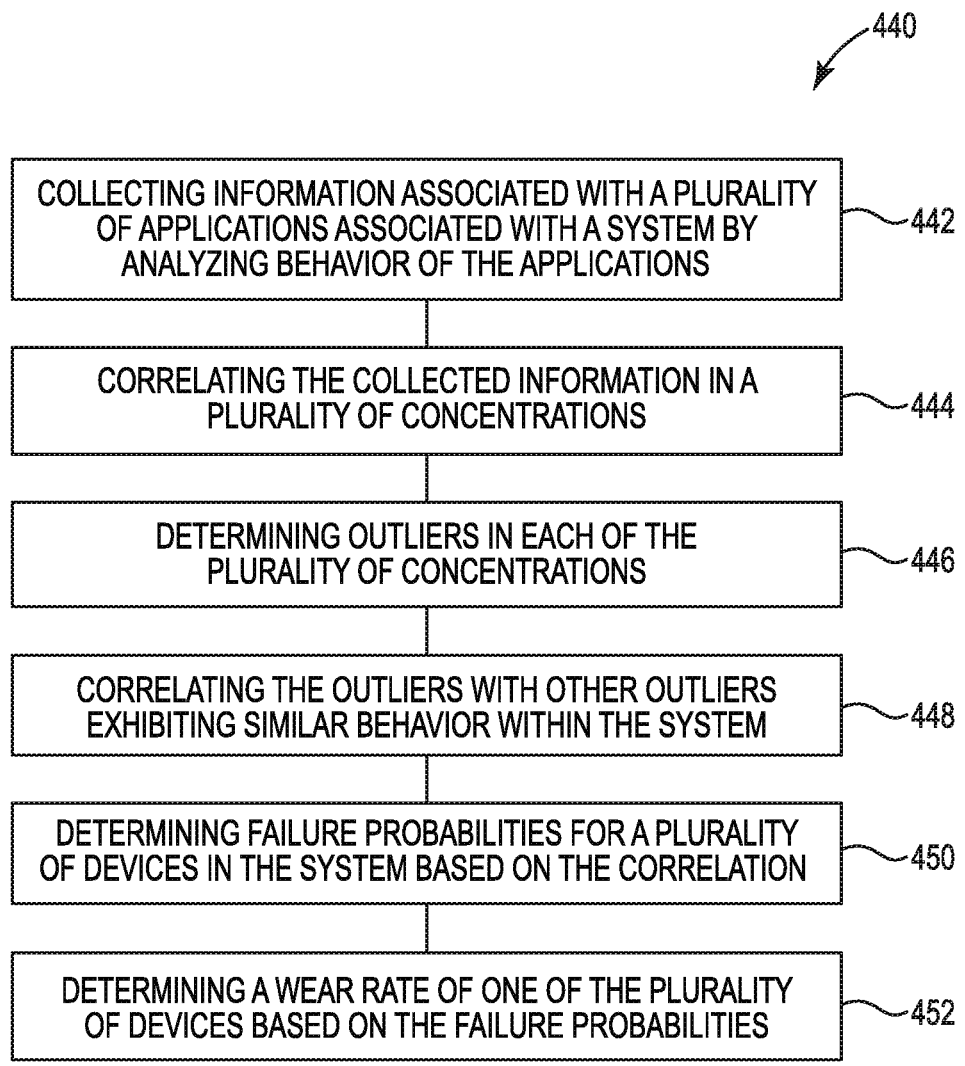
FIG. 4 illustrates a diagram of a method for determining a device wear-rate according to an example.

FIG. 4 illustrates a diagram of a method 440 for determining a device wear-rate according to an example. At 442, method 440 can include collecting information associated with a plurality of applications associated with a system by analyzing behavior of the applications. This can be collected, for instance, using a file system device driver. In some examples, collecting information can include analyzing read and write activities for each of the plurality of applications. Analyzing the read and write activities can include determining lengths of read and write activities of each of the plurality of applications.

At 444, method 440 can include correlating the collected information in a plurality of concentrations. For instance, device profiles of particular concentrations (e.g., clerical workers) can have a wear-rate different than device profiles of a different concentration (e.g., engineer, software developer, etc.). Information collected with respect to these concentrations can include types of applications used, number of writes performed, etc., and this information can be correlated.

Method 440, at 446, can include determining outliers in each of the plurality of concentrations. Determining outliers can include determining system devices within each of the plurality of concentrations having faster wear-rates as compared to other system devices within each of the plurality of concentrations. For instance, outliers can be found in particular business groups, locations, time or date devices were used, applications used, etc.

At 448, method 440 can include correlating the outliers with other outliers exhibiting similar behavior within the system. For instance, the outliers can be correlated within an ecosystem (e.g., with a business, network, system, etc.) of others with like behaviors, and a determination of a wear-rate can be made. For instance, certain outlier devices can be failing faster than other devices in a particular concentration and/or ecosystem. In such an example, as shown at 450, method 440 can include determining failure probabilities for a plurality of devices in the system based on the correlation. For instance, a correlation between a particular application used with particular devices can cause faster failure in the devices, increasing their failure probabilities.

Method 440, at 452, can include determining a wear-rate of one of the plurality of devices based on the failure probabilities. Devices with higher and/or faster failure probabilities can have faster wear-rates, in some examples. Devices using a particular application shown to cause higher failure probabilities can have faster wear-rates than devices that do not use that particular application or use it less frequently, for instance.

Method 440 can also include comparing performances of each of the plurality of devices to one another based on an application load associated with each of the plurality of devices and an amount of time the application load was applied to each of the plurality of devices. Additionally or alternatively, method 440 can include creating a filtering subsystem based on the wear-rate determination.

In the foregoing detailed description of the present disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. Further, as used herein, "a number of" an element and/or feature can refer to one or more of such elements and/or features.

What is claimed:

1. A device, comprising:
a processor resource; and
a non-transitory memory resource storing machine-readable instructions stored thereon that, when executed, cause the processor resource to:
tag input/output (I/O) system requests associated with a device;
catalog the tagged I/O system requests based on an application executing the I/O system requests;
compare the tagged I/O system requests to a data payload exercised against physical segments of the device; and
determine an impact of the application on the device based on the comparison of the tagged I/O system requests.

2. The device of claim 1, wherein the processor resource is to monitor the I/O system requests from direct application programming interfaces.

3. The device of claim 1, wherein the processor resource is to monitor the I/O system requests from a memory-mapped I/O.

4. The device of claim 1, wherein the processor resource is to catalog the I/O system requests based on application context, amount of I/O, type of I/O, and time.

5. The device of claim 1, wherein the processor resource is to analyze cataloged I/O system requests to determine groupings of commonality and determine an outlier within the tagged I/O system requests.

6. A method, comprising:
tagging information associated with input output (I/O) system requests from a plurality of applications on a plurality of devices within a system, wherein the plurality of applications utilize different I/O methods;
correlating the tagged information for the plurality of devices based on the plurality of applications associated with the tagged information;
determining outliers for the plurality of applications based on the correlation of the tagged information for the plurality of devices within the system, wherein the outliers are I/O system requests that have a higher failure probability than other I/O system requests that include similar behaviors;
correlating the outliers with other outliers exhibiting similar behavior on the plurality of devices within the system; and
determining failure probabilities for the plurality of devices within the system based on the correlation and the plurality of applications utilized by the plurality of devices in the system.

7. The method of claim 6, wherein the outliers perform differently when devices have faster wear-rates as compared to other I/O system requests.

8. The method of claim 6, further comprising creating a filtering subsystem of the system based on a wear-rate determination.

9. The method of claim 6, further comprising comparing performances of each of the plurality of devices to one another based on an application load associated with each of the plurality of devices and an amount of time the application load was applied to each of the plurality of devices.

10. A non-transitory machine-readable medium storing instructions executable by a processing resource to cause a computing system to:

monitor interactions between a file system and an application layer of the computing system;

tag the interactions;

compare the tagged interactions to a data payload of the interactions exercised against physical segments of a plurality of system devices;

create device usage patterns based on the tagged interactions and data payload of the interactions against the physical segments;

collate the device usage patterns across a plurality of system devices using a network services layer and a database; and determine an impact of the application layer on the plurality of system devices based on the device usage patterns of the plurality of system devices.

11. The non-transitory machine-readable medium of claim 10, wherein the impact of the application layer includes modifications to I/O operations of a cache manager.

12. The non-transitory machine-readable medium of claim 10, wherein the tag is monitored through an I/O process flow of interactions between the file system and the application layer of the computing system.

* * * * *